(12) United States Patent
Laraway et al.

(10) Patent No.: US 9,240,911 B1
(45) Date of Patent: Jan. 19, 2016

(54) DECOUPLED EQUALIZER IN A COMMUNICATIONS RECEIVER

(71) Applicant: L-3 Communications Corp., New York, NY (US)

(72) Inventors: Stephen A. Laraway, Kaysville, UT (US); Anthony D. Smith, Murray, UT (US); Dan M. Griffin, Bountiful, UT (US); Jeffrey B. Bench, Lehi, UT (US); David G. Landon, Bountiful, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/268,525

(22) Filed: May 2, 2014

(51) Int. Cl.
*H03K 5/159* (2006.01)
*H04L 25/03* (2006.01)
*H04L 7/00* (2006.01)
*H03H 7/40* (2006.01)
*H03H 7/30* (2006.01)

(52) U.S. Cl.
CPC ........ *H04L 25/03057* (2013.01); *H04L 7/0087* (2013.01)

(58) Field of Classification Search
CPC ................... H04L 25/03038; H04L 25/03057; H04L 25/03133; H04L 27/2647; H04L 7/0087
See application file for complete search history.

(56) References Cited

U.S. PATENT DOCUMENTS

| 7,369,631 | B1 * | 5/2008 | Gifford et al. ................. 375/346 |
| 8,081,715 | B1 * | 12/2011 | Savoj ..................... H03H 15/00 340/316 |
| 8,526,540 | B2 | 9/2013 | Poegel et al. |
| 8,605,828 | B2 | 12/2013 | Chaudhary et al. |
| 2004/0042537 | A1 * | 3/2004 | Frank ............................ 375/152 |
| 2012/0329383 | A1 * | 12/2012 | Shamain et al. ............. 455/3.02 |
| 2013/0315346 | A1 * | 11/2013 | Varma et al. ................... 375/316 |

OTHER PUBLICATIONS

"Single-User Channel Estimation and Equalization," IEEE Signal Processing Magazine (May 2000), pp. 17-28.
Falconer et al., "Broadband Wireless Using Single Carrier and Frequency Domain Equalization," WPMC (Oct. 2002), 10 pages.
Falconer et al., "Frequency Domain Equalization for Single-Carrier Broadband Wireless Systems," IEEE Communications Magazine (Apr. 2002), pp. 58-66.
Qureshi, "Adaptive Equalization," Proceedings of the IEEE, vol. 73, No. 9 (Sep. 1985), pp. 1349-1387.
Ready et al., "Blind Equalization Based on Radius Directed Adaptation," IEEE (1990), pp. 1699-1702.

* cited by examiner

*Primary Examiner* — Ted Wang
(74) *Attorney, Agent, or Firm* — Kirton | McConkie (57) ABSTRACT

A digital communications receiver can comprise a digital filter that can be configured and later reconfigured multiple times as, for example, a matched filter, an equalizer, a matched filter and equalizer, or the like. For example, the digital filter can be initially configured as a matched filter for use with a correlation module to detect pilot symbols. Detected pilot symbols can be utilized to estimate characteristics of a channel from the distant transmitter to the receiver, and the estimated channel characteristics can be used to determine coefficients for an equalizer for reducing channel distortion in future transmissions received over the channel. The digital filter can then be configured as an equalizer or a matched filter and equalizer. If the later, the digital filter can both equalize incoming transmissions from the distant transmitter and, with a correlation module, identify any pilot symbols in the transmissions. Any detected pilot symbols can be utilized to determine again equalizer coefficients for equalizing transmissions received over the channel, and the digital filter can be updated accordingly.

35 Claims, 6 Drawing Sheets

DECOUPLED EQUALIZER IN A COMMUNICATIONS RECEIVER

BACKGROUND

In modern communications systems, a digital receiver is a device tasked with, among other things, receiving, digitizing, demodulating, and decoding a communications signal transmitted by a distant transmitter. Such communications signals, however, are subject to distortion, and the signal received at the receiver is thus typically a distorted version of the transmitted signal. Although receivers typically include modules designed to detect and correct some of the effects of distortion in the received signal, prior art modules have only been able to reliably do so when the distortion is less than a threshold. Simply put, the prior art has been unable to reliably process signals that are excessively distorted. Some embodiments of the invention provide improvements in a receiver that allow for more reliable processing of distorted signals and thus can reliably process received signals having greater levels of distortion than prior art receivers.

Typically, the wider the frequency band in which a signal is transmitted, the greater the signal is distorted before arriving at the receiver. Moreover, the greater the number of binary bits that the symbols in the signal represent, the less distortion the receiver can tolerate. For these reasons, some embodiments of the present invention can be particularly well suited for so called wideband communications systems and/or communications systems in which the symbols in the transmitted signal represent a relatively high number of binary bits. The present invention, however, is not limited to any minimum transmission frequency band width or the use of symbols that represent any minimum number of binary bits.

SUMMARY

In some embodiments of the invention, a process of operating a communications receiver can include equalizing, with a digital filter, unsynchronized digitized waveforms of a transmission received at the receiver from a distant transmitter. The foregoing equalizing can produce unsynchronized equalized waveforms, which can then be synchronized. The foregoing process can thus equalize digitized waveforms representing a received transmission before synchronizing the waveforms to any timing or phase component in the receiver.

In some embodiments of the invention, a communications receiver can include a digital filter, timing and phase synchronization loops, and filter control means. The timing and phase synchronization loops can be connected to an output of the digital filter, and the filter control means can configure the digital filter initially as a matched filter and then reconfigure the digital filter as an equalizer or a matched filter and equalizer.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," or "coupled to" are used herein, one element (e.g., a material, a layer, a substrate, etc.) can be "on," "attached to," or "coupled to" another element regardless of whether the one element is directly on, attached to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

A "matched filter" is a digital filter configured to detect one or more predetermined distinctive characteristics in digitized waveforms. As used herein, an "equalizer" is a digital filter configured to equalize digitized waveforms of a received communications transmission transmitted through a communications channel. "Equalizing" or performing an equalization function on (or channel equalizing or performing a channel equalization function) such digitized waveforms means reducing (e g, minimizing, substantially removing, or the like) channel distortion from the digitized waveforms, where "channel distortion" includes distortion of the transmission as the transmission is transmitted through the channel. An example of "channel distortion" is inter symbol interference (ISI).

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

In some embodiments of the invention, a digital communications receiver can include a digital filter, which can be initially configured as a matched filter for, with a correlation module, identifying pilot symbols in a transmission from a distant transmitter. The pilot symbols can be utilized to estimate characteristics of the channel over which the transmission was received and to calculate equalizer coefficients for configuring the digital filter as an equalizer to reduce channel distortion in future transmissions from the distant transmitter. With the equalizer coefficients determined, the same digital filter that was initially configured as a matched filter can be reconfigured as an equalizer or a combined matched filter and equalizer. The digital filter can be upstream and decoupled from synchronization loops in the receiver. Digitized waveforms of incoming transmissions can thus be equalized before being synchronized. This can reduce the distortion in the waveforms before the waveforms are synchronized, which can improve the probability of successfully synchronizing the waveforms. In some embodiments, the digital filter can be configured as an equalizer and its coefficients adapted during operation of the equalizer without feedback of synchronized waveforms. Various embodiments of the invention can provide the forgoing and/or other advantages.

Figure 1:
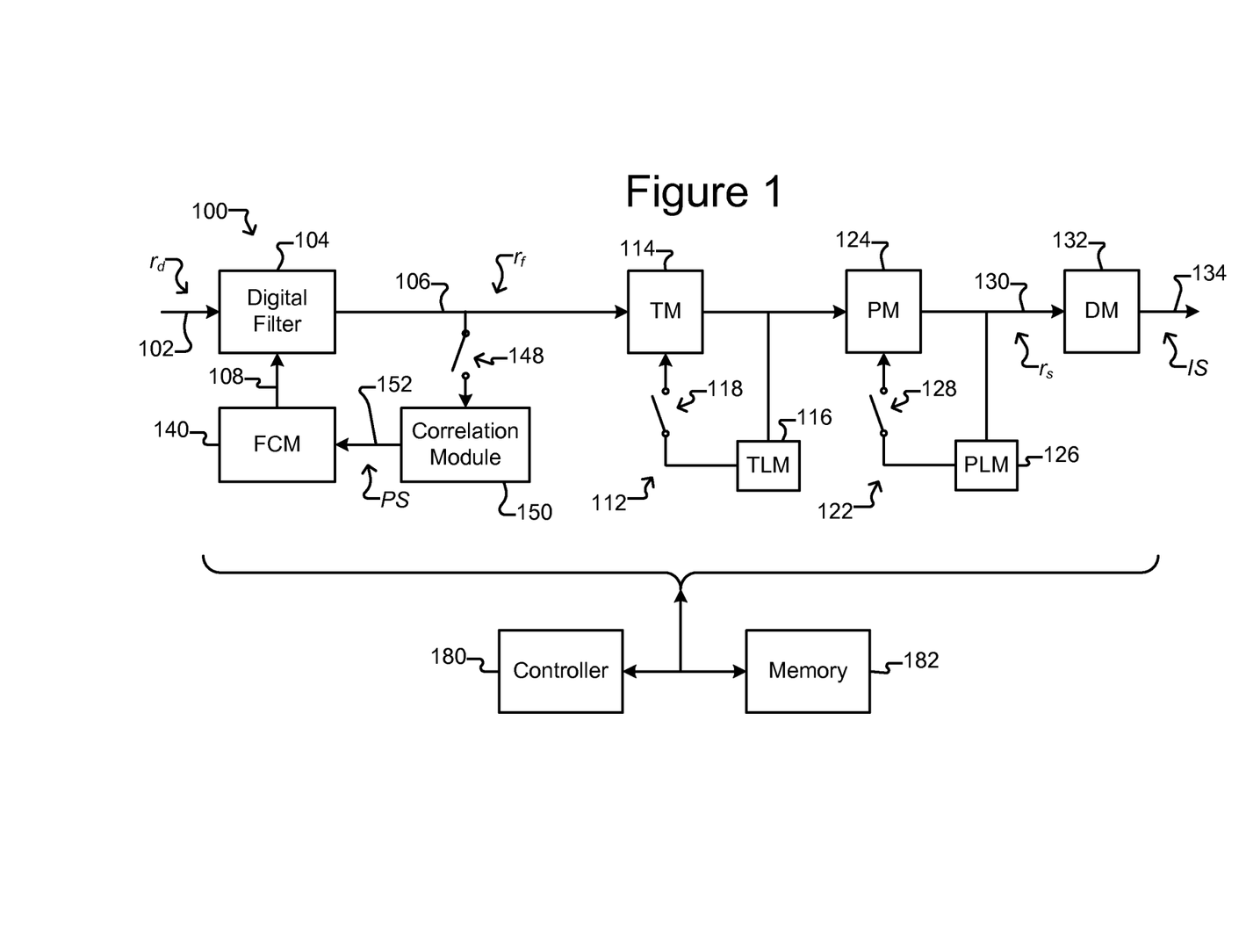
FIG. 1 illustrates examples of components of a digital communications receiver according to some embodiments of the invention.

FIG. 1 illustrates examples of some elements of a digital receiver 100 as described above. As shown, the receiver 100 can include a digital filter 104, which can be followed by a timing synchronization loop (TSL) 112, a phase synchronization loop (PSL) 122, and a decision module 132. The receiver 100 can receive a transmission from a distant transmitter (not shown) and convert the transmission into digital data, which the receiver 100 can, in some embodiments, down convert from the carrier frequency band. Digitized waveforms $r_d$ at the input 102 of the filter 104 can, in some embodiments, be at or near base band. The TSL 112 can time synchronize and the PSL 122 can phase synchronize the filtered versions of the digitized waveforms $r_d$ output 106 by the filter 104. (Hereinafter, the filtered versions of the digitized waveforms $r_d$ output 106 by the filter 104 are referred to as filtered waveforms $r_f$.) For example, the TSL 112 and the PSL 122 can synchronize the filtered waveforms $r_f$ to a time component (not shown) and phase component (not shown) in the receiver 100. Examples of such time and phase components (not shown) include one or more clocks (not shown).

The digitized waveforms $r_d$ at the input 102 to and the filtered waveforms $r_f$ at the output 106 of the filter 104 can thus be unsynchronized digitized waveforms. For example, the digitized waveforms $r_d$ and the filtered waveforms $r_f$ need not have yet been synchronized to any synchronization component (e.g., clock) (not shown) in the receiver 100. As noted, the TSL 112 and the PSL 122 can synchronize the filtered waveforms $r_f$ to one or more synchronization components (e.g., clocks) (not shown) in the receiver 100. The output 130 of the PSL 122 can thus be synchronized waveforms $r_s$ that are synchronized to a synchronization component (e.g., a clock) (not shown) in the receiver 100.

Timing synchronization loops comprising modules such as time controlled numerical controlled oscillators (NCOs), loop filters, time error detection (TED) modules, and the like are known in the field, and the TSL 112 in FIG. 1 can comprise one or more of such modules (which are represented in FIG. 1 generically as a timing module 114 and a timing loop module 116). Phase synchronization loops comprising modules such as phase controlled NCOs, loop filters, phase error detection (PED) modules, and the like are likewise known, and the PSL 122 can comprise one or more of such modules (represented in FIG. 1 generically as a phase module 124 and a phase loop module 126). As shown in FIG. 1, the TSL 112 can also include a switch 118, which can selectively enable and disable the TSL 112, and the PSL 122 can similarly include a switch 128 for selectively enabling and disabling the PSL 122.

The TSL 112 and/or the PSL 122 can also perform other functions. For example, in some embodiments the TSL 112 (e.g., the timing module 114) can interpolate the filtered waveforms $r_f$ at its input. Such interpolation can be fractional, and the output of the TSL 112 can be an integer multiple (e.g., two) times the symbol rate of the waveforms (e.g., the filtered waveform $r_f$) being processed in the receiver 100. The filter 104, even when configured to perform equalization, thus need not be operated at a sample rate that is any particular multiple (e.g., an integer multiple) of the symbol rate.

The decision module 132 can determine the identity of information symbols IS in the synchronized waveforms $r_s$. The decision module 132 can thus output 134 a stream of information symbols IS, each of which can represent one or more particular patterns of m binary information bits. The number m can be an integer greater than or equal to one. For example, m can be 1, 2, 4, 8, 16, 32, 64, or more. The information symbols IS (as well as pilot symbols PS discussed below) can be modulated in accordance with any simple or complex modulation scheme many of which are known.

As also shown in FIG. 1, the receiver 100 can further include a filter control module (FCM) 140, a correlation module 150, a controller 180, and a digital memory 182. As will be seen, the FCM 140 can configure the filter 104 to be any of a variety of different types of filters and thus to perform any of a variety of different filtering functions on the digitized waveforms $r_d$. The FCM 140 can do so in accordance with an input 142, which can include pilot symbols PS identified by the correlation module 150. The pilot symbols PS can, like the information symbols IS discussed above, represent a particular pattern of m binary bits, where m is as discussed above. The controller 180 can control portions or over all operation of the receiver 100. The memory 182 can be any type of digital memory device including semiconductor, magnetic, optical, or the like based memory devices.

The digital filter 104 can perform a filtering function on digitized waveforms $r_d$ at its input 102 and thereby produce filtered waveforms $r_f$ at its output 106. The digital filter 104 can be any type of digital filter many types of which are known in the art. For example, the digital filter 104 can comprise x taps, where each tap comprises registers (not shown) for storing a coefficient and an element of the digitized waveforms $r_d$ and a multiplier (not shown) for multiplying the element of the digitized waveforms $r_d$ by the coefficient. The filter 104 can also include additional modules (not shown) for combining (e.g., summing) the results of the multiplications in each of the taps. The filter 104 can thus store x coefficient values, repeatedly multiply elements of the digitized waveforms $r_d$ by the x stored coefficient values, and mathematically combine the products to produce the output 106. The digital filter 104 can be, for example, an x tap finite impulse response (FIR) filter such as a serial FIR filter, a parallel FIR filter, a hybrid serial/parallel FIR filter, or a frequency domain FIR filter that uses an overlap-add or overlap-save algorithm. As yet another example, the digital filter 104 can comprise an infinite impulse response (IIR) filter. Regardless, the number x of taps and thus coefficients of the filter 104 can be an integer such as two, three, four, five, ten, or greater.

As is known, the particular values of the x coefficients stored in the digital filter 104 can define the filtering function of the digital filter 104. The filtering function of the digital filter 104 can thus be controlled by setting the x coefficients of the digital filter 104 to a particular set of values that corresponds to the desired filtering function. Thereafter, the filtering function of the digital filter 104 can be changed by changing one or more of the values of the x coefficients. As will be seen, the FCM 140 can set and later change the values of the x coefficients and thereby configure and then reconfigure the digital filter 104 to perform any of a variety of different filtering functions. For example, it is contemplated that the FCM 140 can alternatively configure the digital filter 104 in FIG. 1 at least as a matched filter, an equalizer, and/or a matched filter and equalizer.

As noted, a matched filter can detect one or more predetermined distinctive characteristics in waveforms. For example, a matched filter can filter waveforms at its input so as to highlight in the output pulses having a particular shape in the input. The filter 104 in FIG. 1 can thus, for example, be configured to detect a distinctive shape of the pulses of symbols (information symbols IS and pilot symbols PS) in the digitized waveforms $r_d$. As an example, the distinctive characteristic can have a greater signal-to-noise (SNR) ratio in the filtered waveforms output by the matched filter than any other characteristic in the filtered waveforms. The FCM 140 can configure the digital filter 104 in FIG. 1 as a matched filter by loading a particular set of x coefficient values into the filter 104 that cause the filter 104 to perform a matched filtering function for a particular pulse shape in waveforms at its input. (Hereinafter, a particular set of coefficient values for configuring the digital filter 104 as a matched filter are referred to as a set of "matched filter coefficient values.") One or more such sets of matched filter coefficient values can be, for example, stored in the memory 182, and the FCM 140 can load one of those sets from the memory 182 into the filter 104.

As will be seen, the receiver 100 in FIG. 1 can be initialized while in an initialization mode. While in the initialization mode, the FCM 140 can configure the digital filter 104 as a matched filter for detecting the characteristic pulse shape of symbols in transmissions from the distant transmitter (not shown). Moreover, the correlation module 150 can be configured to identify pilot symbols PS and thus distinguish pilot symbols PS in the filtered waveforms $r_f$ output 106 by the digital filter 104. The filter 104, configured as a matched filter, and the correlation module 150 can thus identify pilot symbols PS in the filtered waveforms $r_f$ output 106 by the filter 104. As shown, the pilot symbols PS can be provided to an input 142 of the FCM 140, which can utilize one or more of the identified pilot symbols PS to reconfigure the filter 104 as a channel equalizer or a combined matched filter and channel equalizer for operation of the receiver 100 in an operational mode.

As shown in FIG. 1, the filter 104 can be upstream (in the data flow in the receiver 100) from the synchronization loops 112, 122. Moreover, the filter 104, correlation module 150, and FCM 140 can perform the foregoing initialization of the filter 104 as an equalizer or a combined matched filter and equalizer utilizing unsynchronized digitized waveforms $r_d$ and unsynchronized filtered waveforms $r_f$, which have not been synchronized to any synchronization component (e.g., timing component or phase component) in the receiver 100. Indeed, the filter 104, correlation module 150, and FCM 140 can do so without the need for a feedback of any later synchronized version of the waveforms (e.g., the synchronized waveforms $r_s$ at the output 130 of the TSL 112 and PSL 122). Thus, there need not be an input of any synchronized waveform (or signal) in the receiver 100 to the filter 104, the correlation module 150, or the FCM 140.

Although not shown in FIG. 1, a separate match filter can be provided in the receiver 100 front of the digital filter 104. In such a configuration, the separate matched filter (not shown) can perform a matched filtering operation on the digitized waveforms $r_d$, and the digital filter 104 can filter the waveforms output by the separate matched filter (not shown).

Such an alternative configuration can be utilized in any description of the receiver 100 or in any of the process shown in FIGS. 2 through 7, in which case the filter 104 would not be configured initially as a matched filter or as a combined matched filter and equalizer.

As discussed above, a channel equalizer can be a digital filter configured to reduce (e.g., minimize, substantially remove, or the like) channel distortion (e.g., ISI) in a digitized version of a received transmission of a communications signal. The FCM 140 can configure the filter 104 as a channel equalizer by utilizing one or more of the detected pilot symbols received over a channel (not shown) from a distant transmitter (not shown) to estimate one or more characteristics of the channel and then using the estimated channel characteristic(s) to determine a particular set of x coefficient values for configuring the digital filter 104 as an equalizer to reduce channel distortion in digital waveforms $r_d$ of future transmissions from the distant transmitter (not shown). (Hereinafter, a particular set of coefficient values for configuring the digital filter 104 as a channel equalizer are referred to as a set of "equalizer coefficient values.") The FCM 140 can configure (or reconfigure) the digital filter 104 as a channel equalizer by loading the equalizer coefficient values into the filter 104.

A variety of techniques are known for estimating channel characteristics from pilot symbols received over the channel and then utilizing the pilot symbols to determine coefficients for an equalizer, and the FCM 140 can utilize any such techniques. Examples of such techniques include zero-forcing algorithms and minimum means-squared-error (MMSE) algorithms, including adaptive algorithms such as least mean squares (LMS) or recursive least squares (RLS) adaptive algorithms.

As noted above, the FCM 140 can configure the digital filter 104 as a matched filter or a channel equalizer. As another example, the FCM 140 can configure the digital filter 104 as a combined matched filter and equalizer. For example, the FCM 140 can combine a set of matched filter coefficient values and equalizer coefficient values to produce a set of combined MF/equalizer coefficient values that configure the digital filter 104 to perform both a matched filtering function and an equalization function on digitized waveforms $r_d$ at its input 102. So configured, the filter 104 can both detect symbols in the digitized waveforms $r_d$ at its input 104 and reduce channel distortion in the digitized waveforms $r_d$. The correlation module 150 can then identify any pilot symbols PS in the filtered waveforms $r_f$ output 106 by the filter 104, and the TSL 112 and the PSL 122 can synchronize the filtered waveforms $r_f$ in time and phase to produce synchronized waveforms $r_s$, which can be decoded into a stream of information symbols IS as discussed above.

As is known, a channel equalizer can be adaptive. That is, as an equalizer is reducing the channel distortion in digital waveforms, one or more of the values of the coefficients of the digital filter can be changed (e.g., repeatedly over time) in accordance with an adaptation algorithm to improve the performance of the equalizer. After configuring the filter 104 as an equalizer or a combined matched filter and equalizer (as discussed above), the FCM 140 can perform an adaptation algorithm to adapt (change) the value of one or more of the x coefficients stored in the filter 104 to improve the equalization operation of the filter 104.

For example, the FCM 140 can adapt values of the x coefficients stored in the filter 104 in accordance with new pilot symbols PS detected in transmissions from the distant transmitter. That is, configured as a matched filter and equalizer, the filter 104 can both reduce channel distortion in the digitized waveforms $r_d$ and detect symbols in the digitized waveforms $r_d$. The filtered waveforms $r_f$ can be provided to both the correlation module 150 and the TSL 112 and the PSL 122. The correlation module 150 can identify pilot symbols PS, which the FCM 140 can utilized to estimate new channel characteristics corresponding to residual channel distortion not being corrected by the equalizer function of the filter 104. The foregoing estimation of new channel characteristics can be performed using any technique for estimating channel characteristics, including any channel estimation techniques identified herein. The FCM 140 can then determine a new set of equalizer coefficient values for reconfiguring the equalizer function of the filter 104 to better reduce the channel distortion. The FCM 140 can combine the new equalizer coefficient values with the matched filter coefficient values and load the combined coefficient values into the filter 104. The distant transmitter (not shown) can include occasional pilot symbols PS in transmissions to the receiver 100, and the FCM 140 can thus adapt the values of the coefficients of the filter 104 as those occasional pilot symbols PS are identified (by the matched filter function of the filter 104 and the correlation module 150) in the digitized waveforms $r_d$ of transmissions from the distant transmitter (not shown).

As discussed above and shown in FIG. 1, the filter 104 can be upstream from any synchronization loops (e.g., TSL 112, and PSL 122) or components, and there need be no feedback of a synchronized version of the waveforms (e.g., synchronized waveforms $r_s$) to the digital filter 104, the correction module 140, or the filter control module 140. The filter 104 can thus detect symbols in and equalize the digitized waveforms $r_d$ before the filtered waveforms $r_f$ at the output 106 of the filter 104 are synchronized (e.g., by the TSL 112 and the PSL 122), and the correlation module 150 can identify pilot symbols in the filtered waveforms $r_f$ and the FCM 140 can utilize the identified pilot symbols to calculate new equalizer coefficient values (as discussed above) utilizing only unsynchronized waveforms (e.g., digitized waveforms $r_d$ and filtered waveforms $r_f$) and without using feedback of any later synchronized version of the waveforms (e.g., the synchronized waveforms $r_s$ at the output 130 of the PSL 122).

The filter 104 can thus be operated as an adaptive equalizer at a sample rate that is irrationally related to the symbol rate of the waveforms (e.g., $r_d$, $r_f$, $r_s$) processed in the receiver 100. For example, the filter 104 can be operated as an adaptive equalizer at a sample rate that is a non-integer multiple of the symbol rate.

The foregoing adaption can be performed with the switch 148 in FIG. 1 closed and thus connecting the output 106 of the filter 104 to the correlation module 150. Alternatively, the switch 148 and/or a similar switch (not shown) between the correlation module 150 and the FCM 140 can be opened, and the FCM 140 can adapt the coefficients of the equalizer portion of the filter 104 using other adaption algorithms such as decision-based adaptation algorithms (e.g., that utilize feedback of synchronized waveforms such as the output 134 of the decision module 132, the output 130 of the PSL 122, or the like) or blind adaption algorithms. Many such adaption algorithms are known, and any can be utilized by the FCM 140.

The controller 180 can comprise a programmable module (e.g., a microprocessor, microcontroller, computer, or the like) configured to operate in accordance with machine executable instructions (e.g., software, firmware, microcode, or the like) stored as non-transitory signals and/or data in a non-volatile digital memory such as memory 182. Alternatively or in addition, the controller 180 can comprise hardwired digital logic circuitry and/or analog circuitry.

Regardless, the controller 180 and the memory 182 can be connected to any one or more of the other elements in FIG. 1. Such connections (not shown in FIG. 1) can include data connections, control signal connections, status signal connections, and the like. Also, the controller 180 and the memory 182 can be single stand alone devices as shown in FIG. 1. Alternatively, all or part of the controller 180 and/or the memory 182 can be distributed among one or more of the other elements of the receiver 100. For example, a portion of the controller 180 and the memory 182 can be embedded in the FCM 140 and/or the correlation module 150.

The controller 180 can thus comprise a processor configured to execute machine readable instructions (e.g., software, firmware, microcode, or the like) stored in the memory 182 and/or hardwired digital and/or analog circuitry. Any of the other elements (e.g., the filter 104, the TSL 112, the PSL 122, the correlation module 150, and/or the FCM 140) of the receiver 100 illustrated in FIG. 1 can similarly comprise a processor configured to execute machine readable instructions stored in a memory (e.g., memory 182) and/or hardwired digital and/or analog circuitry. The controller 180 and/or one or more of the other elements (e.g., the filter 104, the TSL 112, the PSL 122, the correlation module 150, and/or the FCM 140) can thus be configured to perform any process, step of a process, function, or the like described herein.

Figure 2:
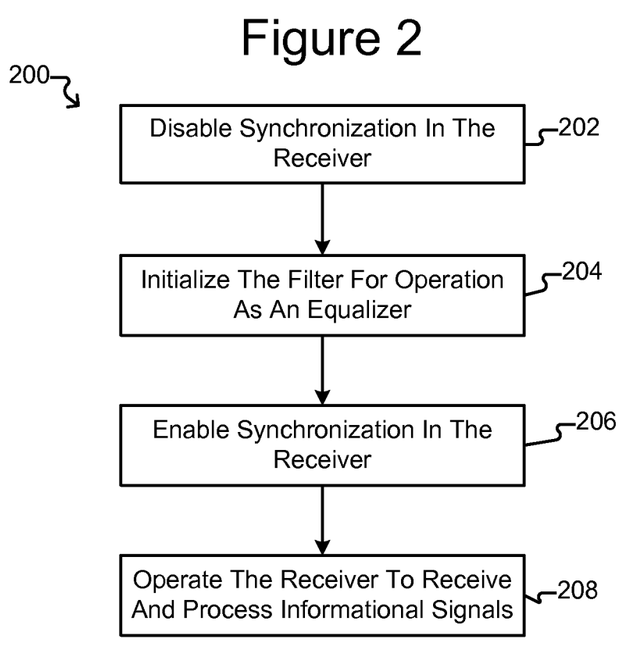
FIG. 2 is an example of a process for initializing and then operating a communications receiver according to some embodiments of the invention.
Figure 3:
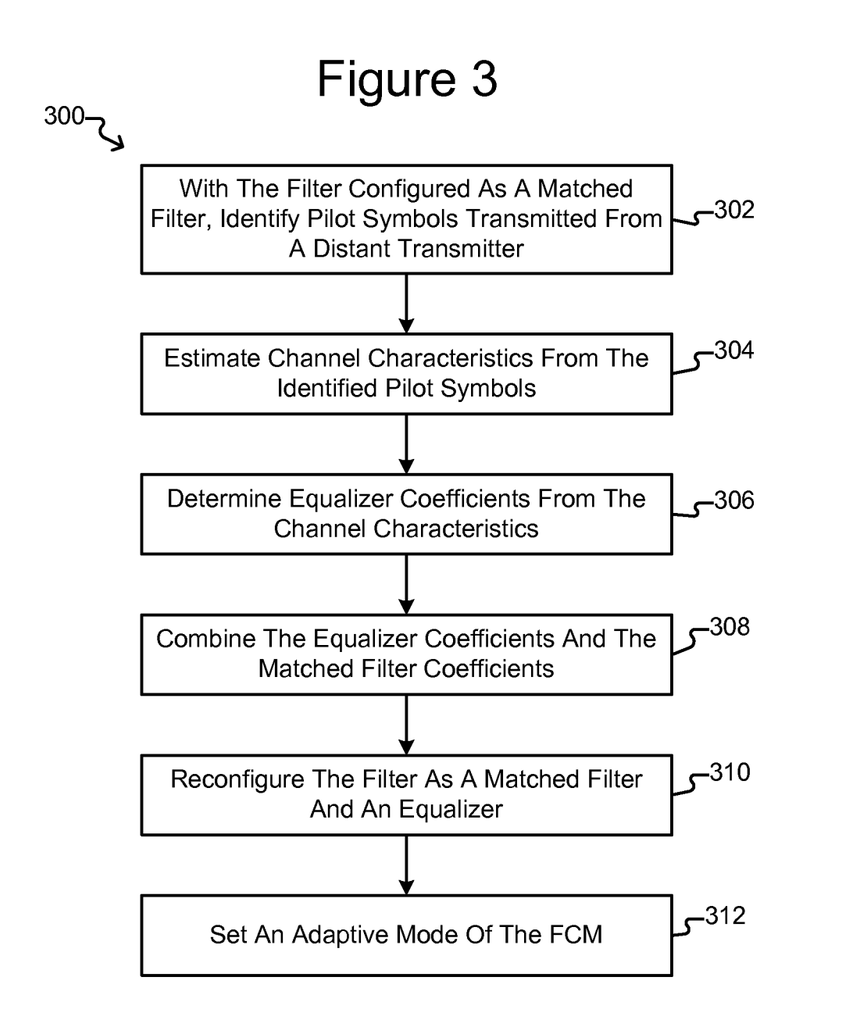
FIG. 3 shows an example of a process for initializing a digital filter in the receiver to perform an equalization function according to some embodiments of the invention.
Figure 4:
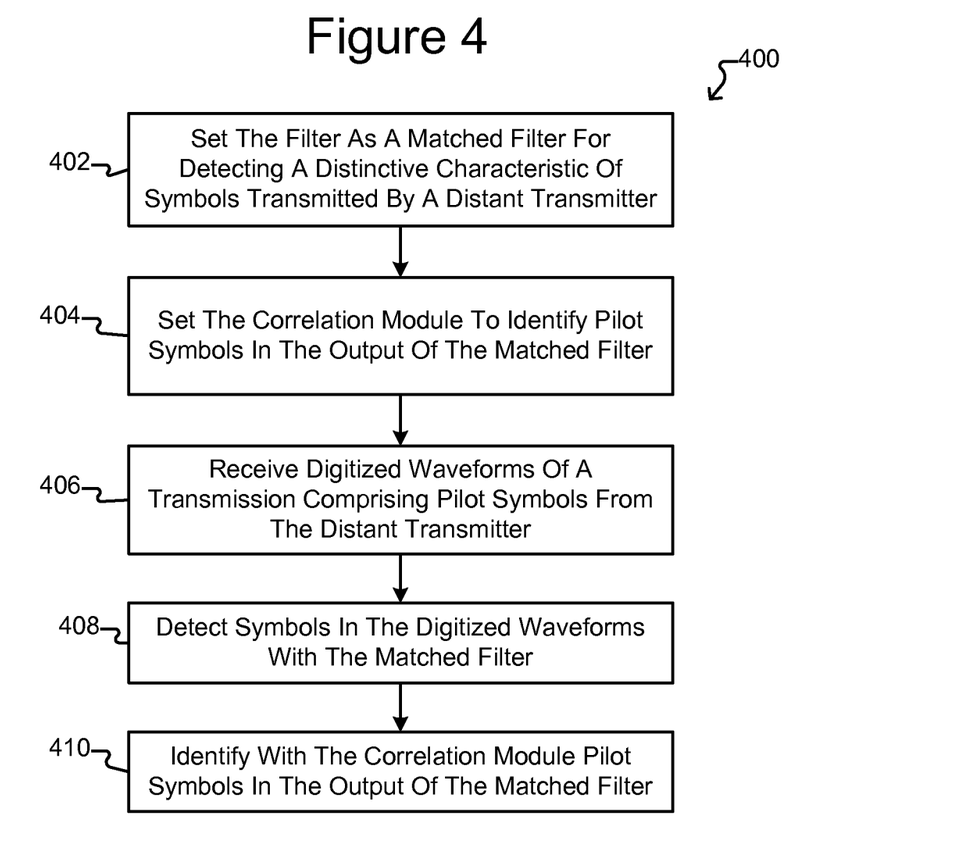
FIG. 4 is an example of a process for identifying pilot symbols in a transmission from a distant transmitter according to some embodiments of the invention.
Figure 5:
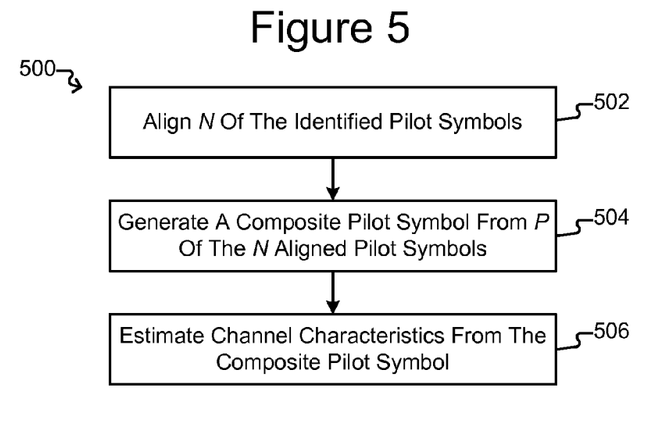
FIG. 5 is an example of a process for estimating channel characteristics utilizing the pilot symbols according to some embodiments of the invention.
Figure 6:
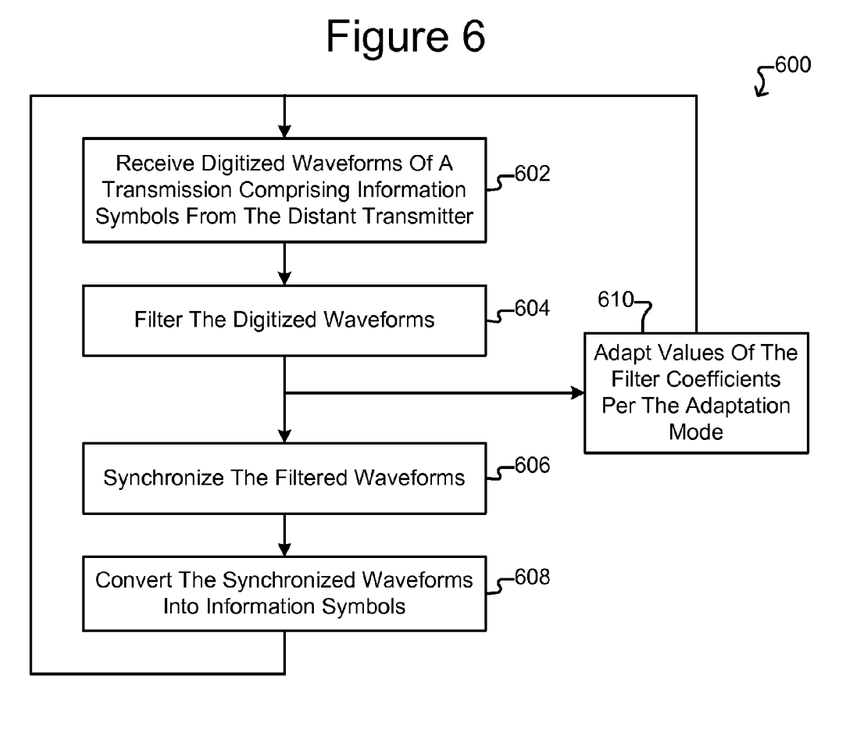
FIG. 6 illustrates an example of a process for operating the initialized receiver according to some embodiments of the invention.

FIGS. 2-7 illustrate processes that can be examples of operation of the receiver 100. The process 200 of FIG. 2 is a high level example of operation of the receiver 100. The process 300 of FIG. 3 is an example of performing the initialization step 204 of FIG. 1. The process 400 of FIG. 4 is an example of performing step 302 of FIG. 3, and the process 500 of FIG. 5 is an example of performing step 304 of FIG. 3. The process 600 of FIG. 6 is an example of performing step 208 in FIG. 1, and the process 700 of FIG. 6 is an example of performing the adaptation step 610 in FIG. 6.

Referring now to FIG. 2, the process 200 can disable synchronization in the receiver 100 at step 202 and, at step 204, initialize the filter 104 for operation as an equalizer (or a matched filter and equalizer). The process 200 can perform step 202 by disabling the TSL 112 and/or the PSL 122 in FIG. 1. For example, the process 200 can open the switch 118 and/or the switch 128. As noted, the process 300 of FIG. 3 is an example by which the filter 104 can be initialized at step 204 for operation as an equalizer.

As shown in FIG. 3, at step 302, the process 300 can identify pilot symbols PS in the digitized waveforms $r_d$. As discussed above, the filter 104, configured as a matched filter, and the correlation module 150 can identify pilot symbols PS in the digitized waveforms $r_d$. FIG. 4 illustrates a process 400 by which step 302 of FIG. 3 can be performed.

As shown in FIG. 4, at step 402, the process 400 can configure the digital filter 104 as a matched filter for detecting the particular shape of symbols transmitted by a distant transmitter (not shown). At step 404, the process 400 can set the correlation module 150 to correlate the output 106 of the filter 104 to pilot symbols PS to be transmitted by the distant transmitter. The switch 148 in FIG. 1 can be closed.

At step 406, the process 400 can receive digitized waveforms $r_d$ of transmissions comprising pilot symbols PS from the distant transmitter (not shown). At step 408, the process 400 can detect with the filter 104 configured as the matched filter the distinctively shaped pulses of symbols in the digitized waveforms $r_d$. At step 410, the process 400 can identify with the correlation module 150 pilot symbols PS in the filtered waveforms $r_f$ output 106 by the filter 104. The process 400 can thus identify one or more pilot symbols PS in the digitized waveforms $r_d$ of a transmission from a distant transmitter (not shown).

Referring again to FIG. 3, after process 300 has identified one or more pilot symbols PS at step 302 (e.g., by performing the process 400 of FIG. 4), the process 300 can, at step 304, utilize the one or more pilot symbols PS to estimate characteristics of the communications channel (not shown) between the transmitter (not shown) and the receiver 100, which is the communications channel through which the pilot symbols PS were transmitted. FIG. 5 illustrates a process 500 by which the step 304 of FIG. 3 can be performed. The process 500 can thus follow performance of the step 302 in FIG. 3 and thus the process 400 of FIG. 4.

As shown in FIG. 5, at 502, the process 500 can align N of the pilot symbols PS identified at step 304. The number N can be an integer that is greater than or equal to two. For example, the number N can be two, three, four, five, ten, fifteen, twenty, or more. The step 502 can comprise substantially aligning the timing and/or phase of all of the N pilot symbols PS with each other, which can be accomplished utilizing the output of the correlation module 150.

At step 504, the process 500 can generate a composite pilot symbol from P of the N aligned pilot symbols PS, where P can be an integer that is less than or equal to N and greater than or equal to two. (Thus, if P is less than N, N can be greater than or equal to three.) At step 504, the process 500 can generate the composite pilot symbol, for example, by resampling and then coherently combining the P pilot symbols PS. As another example, the process 500 can generate at step 504 the composite pilot symbol by averaging the P pilot symbols PS. The composite pilot symbol can thus be an average (e.g., a weighted average) of the P pilot symbols.

At step 506, the process 500 can estimate one or more characteristics of the communications channel (not shown) from the transmitter (not shown) to the receiver 100 and thus the communications channel (not shown) through which the pilot symbols PS were transmitted. For example, the channel characteristics can be estimated at step 506 utilizing any of the channel estimation techniques mentioned above.

Referring again to FIG. 3, after the process 300 has utilized one or more pilot symbols PS identified at step 302 to estimate one or more channel characteristics at step 304, the process 300 can, at step 306, utilize the estimated channel characteristics to determine a set of values (equalizer coefficient values) for the x coefficients of the filter 104 for configuring the filter 104 as an equalizer to reduce channel distortion in digitized waveforms $r_d$ of future transmissions from the same distant transmitter (not shown).

At step 308, the process 300 can combine the equalizer coefficient values determined at step 306 with the matched filter coefficient values utilized at step 402 to configure the filter 104 as a matched filter. The equalizer coefficient values and the matched filter coefficient values can be combined so that the combined coefficient values configure the filter 104 to perform both the matched filtering function and the equalization function discussed above. At step 310, the process 300 can reconfigure the filter 104 as a matched filter and equalizer by loading the combined coefficient values into the filter 104.

In some variations of the process 300, step 308 can be skipped, and the filter 104 can be reconfigured as an equalizer (not a combined matched filter and equalizer) for reducing channel distortion in the digitized waveforms $r_d$ but not also performing a matched filter function. For example, as discussed above, the receiver 100 of FIG. 1 can, alternatively, include a separate matched filter (not shown) disposed in front of the digital filter 104 in FIG. 1. In such a case, the digital filter 104 need be reconfigured only as an equalizer rather than a combined matched filter and equalizer.

Regardless, at step 312, the process 300 can set the FCM 140 to a desired adaptation mode. For example, the process 300 can set the FCM 140 to adapt the equalizer coefficients of the filter 104 utilizing pilot symbols PS as discussed above. As another example, the process 300 can set the FCM 140 to a directed decision adaption mode or a blind adaption mode also as discussed above. As yet another alternative, the process 300 can set the FCM 140 into a non-adaption mode in which the FCM 140 does not adapt the values of the coefficients of the filter 104.

Referring again to FIG. 2, after the process 200 has initialized the filter 104 at step 204 to perform an equalizing function (e.g., by performing the process 300 of FIG. 3), the receiver 100 can be ready to receive information transmissions from the distant transmitter (not shown). Steps 202 and 204 can thus correspond to an initialization mode of the receiver 100. At step 206, synchronization in the receiver 100 can be enabled. For example, the TSL 112 and the PSL 122 can be enabled, for example, by closing switches 118, 128. At step 208, the receiver 100 can operate (in an operational mode) to receive information transmissions from the distant transmitter (not shown). The process 600 of FIG. 6 is an example of performing step 208 of FIG. 2.

As shown in FIG. 6, at step 602, the process 600 can receive digitized waveforms $r_d$, which can be digitized versions of information transmissions from the distant transmitter (not shown). The information transmissions, and thus the digitized waveforms $r_d$, can comprise information symbols IS each of which can represent one or more binary bits of information and, optionally, pilot symbols PS, as discussed above. At step 604, the filter 104 can equalize the digitized waveforms $r_d$ and thus reduce channel distortion in the outputted 106 filtered waveforms $r_f$. At step 606, the TSL 112 and the PSL 122 can synchronize the filtered waveforms $r_f$ as discussed above to produce synchronized waveforms $r_s$. At step 608, the decision module 132 can decode the synchronized waveforms $r_s$ into the information symbols IS.

As shown in FIG. 6, while steps 606 and 608 are being performed, the process 600 can, at step 610, also adapt values of the coefficients of the filter 104, for example, in accordance with the adaptation mode of the FCM 140 set at step 312. Step 610 can thus be performed generally in parallel with steps 606 and 608. The process 700 of FIG. 7 is an example of operation of the FCM 140 for performing step 610.

Figure 7:
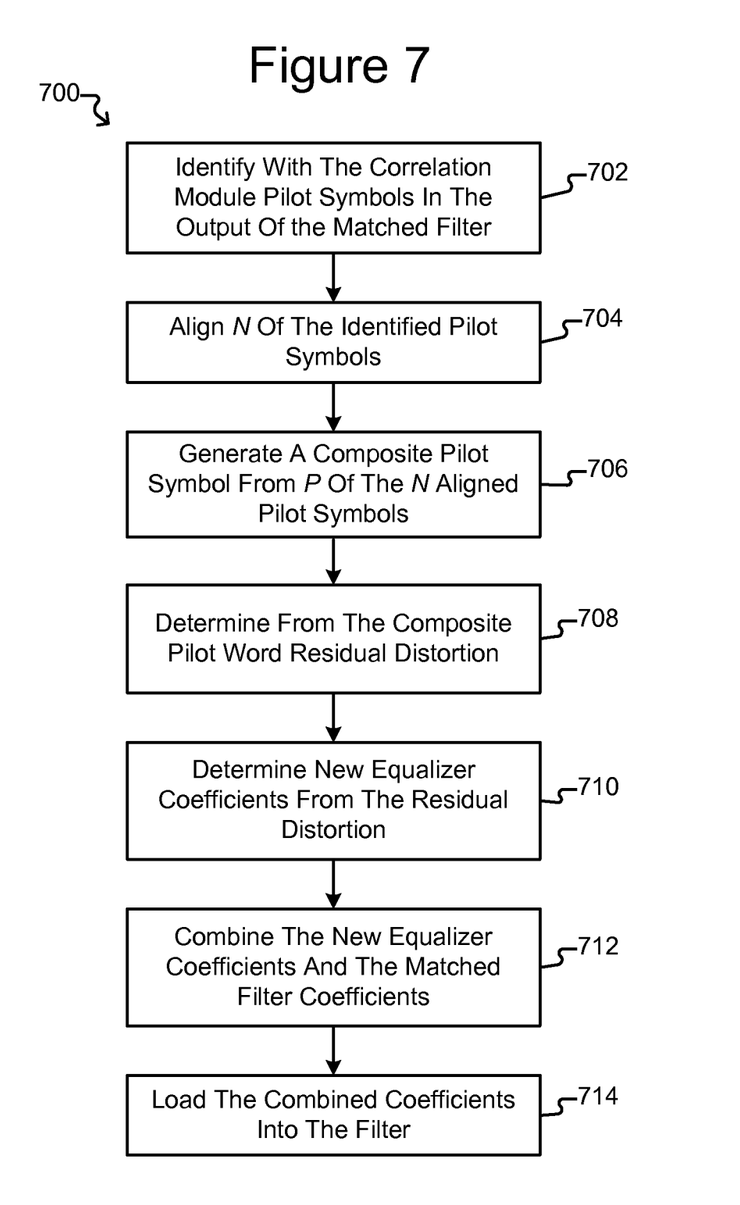
FIG. 7 shows an example of a process for adapting values of the coefficients of the filter configured as an equalizer according to some embodiments of the invention.

For purposes of the process 700 of FIG. 7, it is assumed that the digitized waveforms $r_d$ received at step 602 of FIG. 6 include at least an occasional pilot symbol PS, and the filter 104 was configured as a matched filter and equalizer at step 310 of FIG. 3. It is also assumed that the switch 148 in FIG. 1 is closed.

At step 702, the process 700 can detect with the correlation module 150 any pilot symbols PS in the filtered waveforms $r_f$ output 106 by the filter 104 at step 604 of FIG. 6. At step 704, the process 700 can align N of the pilot symbols PS identified at step 702, which can be accomplished generally as discussed above with respect to step 502 of FIG. 5. At step 706, the process 700 can generate a composite pilot symbol from P of the N aligned pilot symbols, which can be generally the same as described above with respect to step 504 of FIG. 5. At step 708, the process 700 can estimate new channel characteristics corresponding to residual channel distortion not being corrected by the equalizer function of the filter 104 generally as discussed above. At step 710, the process 700 can determine new equalizer coefficient values for reducing the residual channel distortion generally as discussed above. At step 712, the process 700 can combine the new equalizer coefficient values determined at step 710 with the matched filter coefficient values (e.g., as utilized at step 402 to configure the filter 104 as a matched filter). Steps 710 and 712 can be performed, for example, by the FCM 140 generally as discussed above. At step 714, the process 700 (e.g., with the FCM 140) can load the combined filter coefficients into the filter 104 and thereby update the values of the coefficients in the filter 104 in accordance with newly received pilot symbols PS. Repeated performance of the process 700 can thus adapt values of the coefficients of the filter 104, for example, to changing channel conditions.

Moreover, as noted, the filter 104, correlation module 150, and FCM 140 can perform the process 700 for adapting coefficients of the filter 104 utilizing unsynchronized digitized waveforms $r_d$ and unsynchronized filtered waveforms $r_f$, which have not been synchronized to any synchronization component (e.g., timing component or phase component) in the receiver 100. In addition, the filter 104, correlation module 150, and FCM 140 can do so without the need for feedback of any later synchronized version of the waveforms (e.g., the synchronized waveforms $r_s$) at the output 130 of the TSL 112 and PSL 122). Indeed, there need not be an input of any synchronized waveform (or signal) in the receiver 100 to the filter 104, the correlation module 150, or the FCM 140.

In some variations of the process 700, step 712 can be skipped, and the filter 104 can be reconfigured as an equalizer (rather than a combined matched filter and equalizer) for reducing channel distortion in the digitized waveforms $r_d$ but not also performing a matched filter function. For example, as discussed above, the receiver 100 of FIG. 1 can, alternatively, include a separate matched filter (not shown) disposed in front of the digital filter 104 in FIG. 1. In such a case, the digital filter 104 need be reconfigured only as an equalizer rather than a combined matched filter and equalizer.

Referring again to FIG. 6, step 610 can alternatively be performed in other ways. For example, step 610 can be performed in accordance with a directed adaptation algorithm or a blind adaptation algorithm generally as discussed above.

Although specific embodiments and applications of the invention have been described in this specification, these embodiments and applications are exemplary only, and many variations are possible.

We claim:

1. A process of operating a communications receiver, said process comprising:
   equalizing with a digital filter unsynchronized digitized waveforms of a transmission received at said receiver over a communications channel from a distant transmitter, said equalizing producing unsynchronized equalized waveforms; and
   synchronizing said unsynchronized equalized waveforms, wherein said equalizing comprises equalizing said unsynchronized digitized waveforms at a sample rate that is not an integer multiple of a symbol rate of said unsynchronized digitized waveforms.

2. The process of claim 1, wherein:
   prior to said equalizing, said unsynchronized digitized waveforms are not synchronized in phase to any clock component in said receiver,
   prior to said equalizing, said unsynchronized digitized waveforms are not synchronized in timing to any clock component in said receiver, and
   said synchronizing comprises synchronizing timing and phase of said unsynchronized equalized waveforms to a clock component in said receiver.

3. The process of claim 1, wherein:
   said digital filter is an x-tap digital filter configured to perform a filtering function defined by a set of x coefficient values in said digital filter,
   said process further comprising adapting said set of x coefficient values in said digital filter.

4. The process of claim 3, wherein said digital filter is a finite impulse response (FIR) filter.

5. The process of claim 3, wherein said adapting said set of x coefficient values in said digital filter does not utilize any signal synchronized to a timing or phase component in said receiver.

6. The process of claim 1, wherein:
   said digital filter is an x-tap digital filter configured to perform a filtering function defined by a set of x coefficient values in said digital filter, and
   said process further comprises, prior to said equalizing, initializing said digital filter as an equalizer configured to perform said equalizing.

7. A process of operating a communications receiver, said process comprising:
   equalizing with a digital filter unsynchronized digitized waveforms of a transmission received at said receiver over a communications channel from a distant transmitter, said equalizing producing unsynchronized equalized waveforms; and
   synchronizing said unsynchronized equalized waveforms wherein:
      said digital filter is an x-tap digital filter configured to perform a filtering function defined by a set of x coefficient values in said digital filter,
      said process further comprising adapting said set of x coefficient values in said digital filter, and
      said adapting comprises:
         identifying pilot symbols in said unsynchronized digitized waveforms;
         determining with said identified pilot symbols a new set of x coefficient values; and
         loading said new set of x coefficient values in said digital filter.

8. The process of claim 7, wherein said determining said new set of x coefficient values comprises:
   estimating with said identified pilot symbols new channel characteristics corresponding to residual distortion uncorrected by said equalizer, and
   determining from said new channel characteristics a set of x equalizer coefficient values.

9. The process of claim 8, wherein:
   said determining said new set of x coefficient values further comprises combining said set of x equalizer coefficient values with a set of x matched filter coefficient values for configuring said filter as a matched filter to detect a distinctive characteristic of said pilot symbols, and
   said new set of x coefficient values comprises said combination of said set of equalizer coefficient values and said set of matched filter coefficient values.

10. The process of claim 8, wherein:
    said digital filter is configured as a matched filter and equalizer, and
    said identifying said pilot symbols comprises correlating an output of said digital filter for said pilot symbols.

11. The process of claim 10, wherein said determining said new set of x coefficient values comprises:
    aligning N of said identified pilot symbols;
    combining P of said aligned pilot symbols to produce a combined pilot symbol;

estimating with said combined pilot symbol new channel characteristics corresponding to residual distortion uncorrected by said equalizer; and determining said new set of x coefficient values utilizing said new channel characteristics of said channel.

12. The process of claim 11, wherein said combining said P aligned pilot symbols comprises coherently combining said P aligned pilot symbols.

13. A process of operating a communications receiver, said process comprising:

equalizing with a digital filter unsynchronized digitized waveforms of a transmission received at said receiver over a communications channel from a distant transmitter, said equalizing producing unsynchronized equalized waveforms; and synchronizing said unsynchronized equalized waveforms wherein:

said digital filter is an x-tap digital filter configured to perform a filtering function defined by a set of x coefficient values in said digital filter, and said process further comprises, prior to said equalizing, initializing said digital filter as an equalizer configured to perform said equalizing, and said initializing comprises:

identifying pilot symbols in unsynchronized digitized waveforms of an initializing transmission received at said receiver from said distant transmitter; and determining with said identified pilot symbols a set of x equalizer coefficient values for configuring said filter as an equalizer to perform said equalizing.

14. The process of claim 13, wherein said determining said set of x equalizer coefficient values comprises:

estimating with said identified pilot symbols characteristics of said communications channel, and determining from said estimated characteristics of said communications channel said set of x equalizer coefficient values.

15. The process of claim 14, wherein said estimating comprises:

aligning N of said identified pilot symbols;

combining P of said aligned pilot symbols to produce a combined pilot symbol; and estimating with said combined pilot symbol said characteristics of said channel.

16. The process of claim 15, wherein said combining said P aligned pilot symbols comprises coherently combining said P aligned pilot symbols.

17. The process of claim 13, wherein:

said identifying said pilot symbols comprises loading a set of x matched filter coefficient values into said digital filter that configures said digital filter as a matched filter for detecting said distinctive characteristic of said pilot symbols; and said initializing further comprises combining said set of x equalizer coefficient values and said set of x matched filter coefficient values.

18. The process of claim 17, wherein said initializing said digital filter further comprising initializing said digital filter as said equalizer and as said matched filter by loading said combined set of equalizer coefficient values and matched filter coefficient values into said digital filter.

19. A communications receiver comprising:

a digital filter comprising an input and an output, said digital filter configured to perform a filtering function on a signal at said input and provide at said output a filtered version of said signal filtered in accordance with said filtering function;

timing and phase synchronization loops connected to an output path downstream from said output of said digital filter; and filter control means for:

configuring said digital filter as a matched filter wherein said filtering function comprises a matched filtering function, and reconfiguring said digital filter as an equalizer wherein said filtering function comprises an equalizing function.

20. The receiver of claim 19, wherein regardless of a configuration of said digital filter by said filter control means, no input of said digital filter is connected to said timing synchronization loop or said phase synchronization loop.

21. The receiver of claim 19, wherein said filter control means is further for reconfiguring said digital filter as a matched filter and equalizer wherein said filtering function comprises a matched filtering function and an equalizing function.

22. The receiver of claim 21, wherein:

configured as said matched filter, said digital filter is for detecting a distinctive characteristic of symbols in digital waveforms of a transmission received form a distant transmitter; and configured as said matched filter and equalizer, said digital filter is for detecting said distinctive characteristic of said symbols in said digital waveforms and reducing channel distortion in said digital waveforms, said channel distortion is due to a communications channel from said distant transmitter to said receiver.

23. The receiver of claim 22, wherein said digital filter is an x-tap digital filter configured to perform a filtering function defined by a set of x coefficient values in said digital filter.

24. The receiver of claim 23, wherein said digital filter is a finite impulse response (FIR) filter.

25. The receiver of claim 19 further comprising a correlation module connected to an output of said digital filter and configured to correlate filtered waveforms output by said digital filter to pilot symbols.

26. The receiver of claim 19, wherein regardless of a configuration of said digital filter by said filter control means:

said timing synchronization loop loops from said output path to said output path, and said phase synchronization loop loops from said output path to said output path.

27. The receiver of claim 19, wherein regardless of a configuration of said digital filter by said filter control means:

said timing synchronization loop is not connected to any input to said digital filter, and said phase synchronization loop is not connected to any input to said digital filter.

28. The receiver of claim 19, wherein:

said digital filter is an x-tap digital filter configured to perform a filtering function defined by a set of x coefficient values in said digital filter, said filter control means configures and reconfigures said digital filter by changing said coefficient values.

29. A communications receiver comprising:

a digital filter;

timing and phase synchronization loops connected to an output of said digital filter;

filter control means for configuring said digital filter as a matched filter and reconfiguring said digital filter as an equalizer; and a correlation module connected to an output of said digital filter and configured to correlate filtered waveforms output by said digital filter to pilot symbols, wherein said filter control means is further for:
- combining N of said pilot symbols identified by said correlation module into a combined pilot symbol,
- utilizing said combined pilot symbol, estimating characteristics of a communications channel through which said pilot symbols were transmitted, and
- determining a set of x equalizer coefficient values from said estimated characteristics of said channel.

30. The receiver of claim 29, wherein said filter control means reconfigures said digital filter as said equalizer by loading said set of x equalizer coefficient values into said digital filter.

31. The receiver of claim 29, wherein said filter control means reconfigures said digital filter as said matched filter by loading a set of x matched filter coefficient values into said digital filter.

32. The receiver of claim 29, wherein said filter control means reconfigures said digital filter as said matched filter and equalizer by:
- combining said x equalizer coefficient values with a set of x matched filter coefficient values, and
- loading said combined coefficient values into said digital filter.

33. The receiver of claim 32, wherein said filter control means is further for:
- combining N of said pilot symbols identified by said correlation module into a combined pilot symbol,
- utilizing said combined pilot symbol, determining new channel characteristics corresponding to residual distortion uncorrected by said digital filter configured as said equalizer, and
- determining a new set of x equalizer coefficient values from said new channel characteristics.

34. A process of operating a communications receiver, said process comprising:
- equalizing with a digital filter unsynchronized digitized waveforms of a transmission received at said receiver over a communications channel from a distant transmitter, said equalizing producing unsynchronized equalized waveforms; and
- synchronizing said unsynchronized equalized waveforms, wherein:
- said transmission comprises information symbols and pilot symbols,
- said equalizing further comprises simultaneously performing a matched filtering with said digital filter of said transmission for said pilot symbols, and
- said process further comprises correlating said unsynchronized equalized waveforms output from said digital filter for said pilot symbols.

35. The process of claim 34, wherein:
- said pilot symbols are indicative of a current condition of said communications channel, and
- said processes further comprises adapting equalizer coefficients of said digital filter in accordance with said pilot symbols.

* * * * *